Oct. 13, 1936.　　　G. T. ELLIS ET AL　　　2,057,566
ENDLESS CLOTHESLINE PULLEY
Filed Jan. 9, 1936
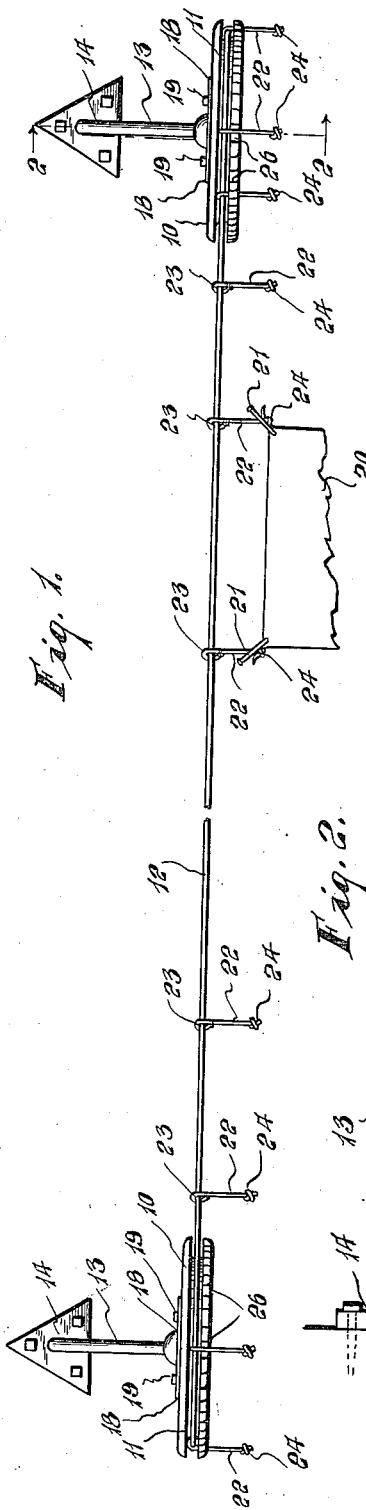
Inventors
George T. Ellis,
Robert C. Bratton
By L. F. Randolph, Jr.
Attorney Patented Oct. 13, 1936

2,057,566

UNITED STATES PATENT OFFICE 2,057,566

ENDLESS CLOTHESLINE PULLEY

George T. Ellis and Robert C. Bratton, Detroit, Mich.

Application January 9, 1936, Serial No. 58,371

2 Claims. (Cl. 254—195)

This invention relates to an "endless clothesline" assembly and generally aims to provide a novel construction which will enable one to hang garments or the like without moving from place-to-place and at the same time to use both runs of the line for hanging or suspension purposes.

It is further aimed to provide a novel construction of pulley in combination with suspending elements carried by the line.

The more specific objects and advantages will become apparent from a consideration of the description following taken in connection with accompany drawing illustrating an operative embodiment.

Drawing:—

Figure 1 is a view of the assembly in side elevation;

Figure 2 is a sectional view taken on the line 2—2 of Figure 1, and on an enlarged scale;

Figure 3 is an inverted plan view of one of the pulleys;

Figure 4 is a sectional view taken on the line 4—4 of Figure 2, and

Figure 5 is a detail of one of the suspending elements.

Referring specifically to the drawing wherein like reference characters designate like or similar parts, a pair of pulleys are used as at 10. Such pulleys are grooved at 11, and have an endless clothes line 12, of usual flexible material trained thereover. Said pulleys 10, are mounted by means of a bracket 13, fastened as at 14, to suitable supports. The forward ends of the brackets are arcuate and terminate in balls 15 engaging spherical depression 16 in the upper surfaces of the pulleys. The balls are also engaged by spherical surfaces 17 of pairs of securing plates 18 detached bolted as at 19 to the pulleys. This construction enables the pulleys to be adjusted since a ball and socket joint is provided of the tightness of the bolt 19 rigidly securing the parts in place under normal conditions.

The garments or other articles suggested as at 20, to be suspended from the line 12 are fastened for instance by means of ordinary clothespins 21 to hanger members 22. Hanger members 22 are preferably formed with loops 23 at their upper ends through which the line 12 passes. In this manner, the extending elements 22 are adjustable along the line. They also are preferably made of rope or other usual clothes line material and preferably have knots 24 at their lower ends guarding against downward displacement of the clothes-pins.

The elements 22 in a vertical or depending position are adapted to pass around the pulleys 10 since the periphery thereof below the grooves 11, is notched as at 26. These notches 26 are multitudinous and enable the extending elements 22 to pass in and out thereof. It will be noted that the connection of the articles 20 to the elements 22 is in a plane below the pulleys, so that no interference will be afforded. The elements 22, in addition, in passing around the pulleys, by reason of the fact that they enter certain notches 26, are aiding in the turning of the pulleys and a consequent reduction of friction.

Various changes may be resorted to provided they fall within the spirit and scope of the invention.

We claim as our invention:—

1. A device of the class described comprising a supporting member having a ball, a pulley, clamping plates secured to the pulley, said clamping plates and pulley engaging said ball and being adjustably mounted thereby.

2. A device of the class described comprising a supporting member having a ball, a pulley, clamping plates secured to the pulley, said clamping plates and pulley engaging said ball and being adjustably mounted thereby, said plates being two in number, and bolts securing the plates to the pulley.

GEORGE T. ELLIS.
ROBERT C. BRATTON.